Sept. 7, 1954　　　J. C. JORGENSEN　　　2,688,146
MACHINE FOR SHAPING UPPERS OVER LASTS
Filed Feb. 7, 1951　　　　　　　　　　　　5 Sheets-Sheet 1

Inventor
Jacob C. Jorgensen
By his Attorney

Sept. 7, 1954     J. C. JORGENSEN     2,688,146
MACHINE FOR SHAPING UPPERS OVER LASTS
Filed Feb. 7, 1951     5 Sheets-Sheet 2

Inventor
Jacob C. Jorgensen
By his Attorney

Sept. 7, 1954  J. C. JORGENSEN  2,688,146
MACHINE FOR SHAPING UPPERS OVER LASTS
Filed Feb. 7, 1951  5 Sheets-Sheet 4
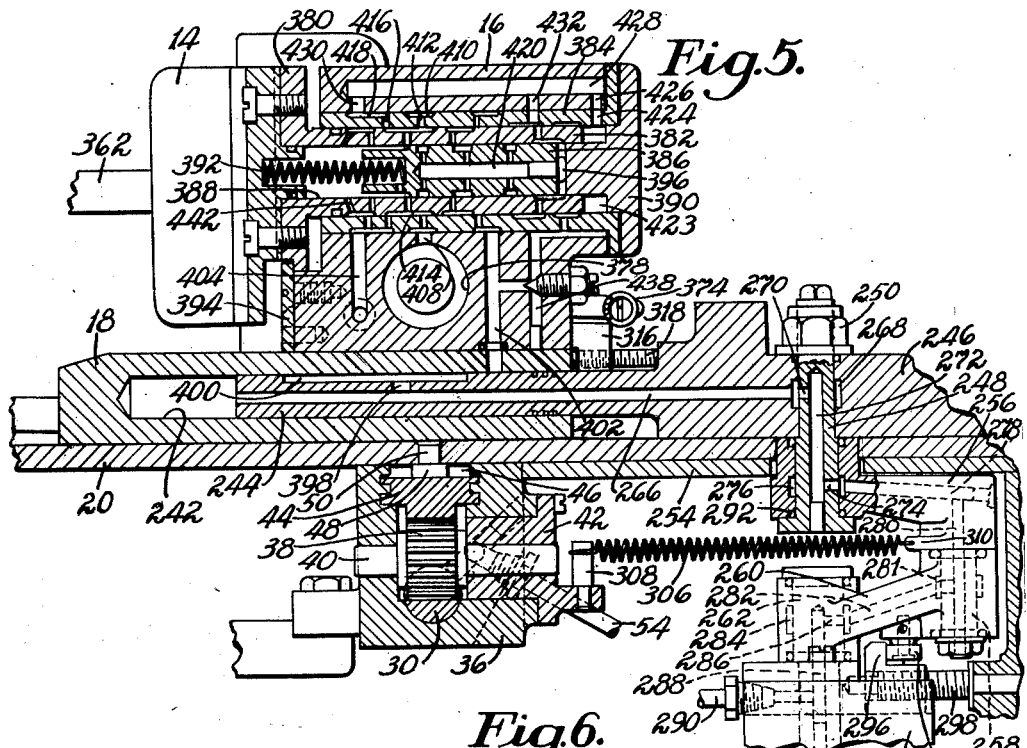
Fig.5.
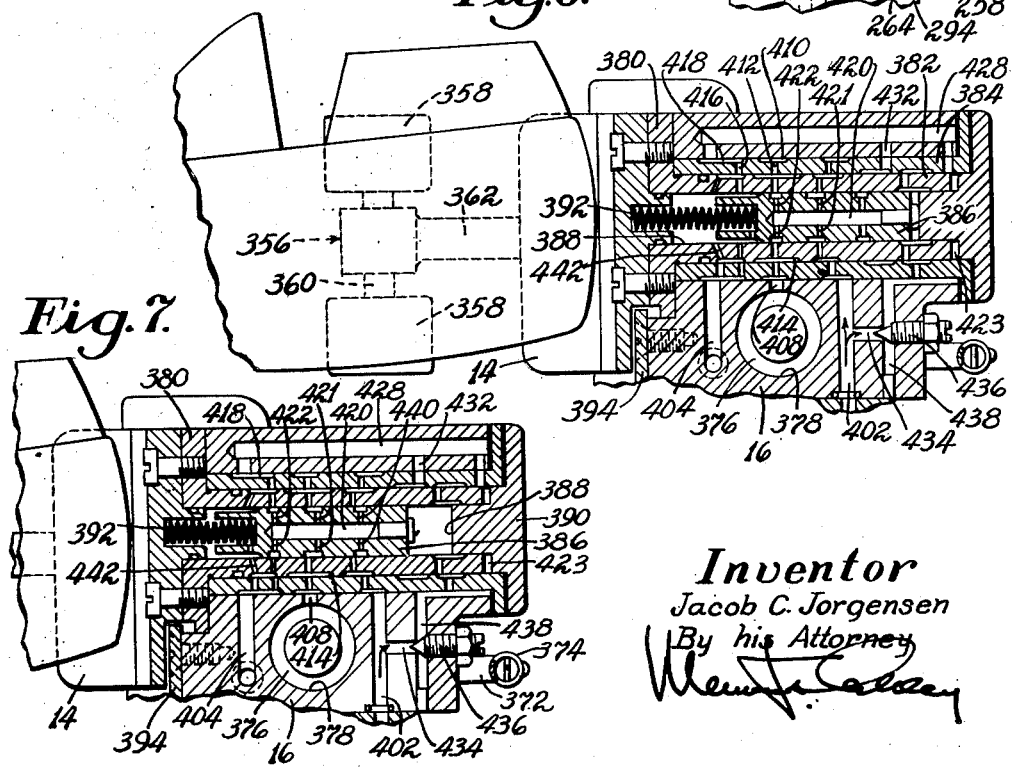
Fig.6.
Fig.7.
Inventor
Jacob C. Jorgensen
By his Attorney Sept. 7, 1954     J. C. JORGENSEN     2,688,146
MACHINE FOR SHAPING UPPERS OVER LASTS
Filed Feb. 7, 1951                           5 Sheets—Sheet 5
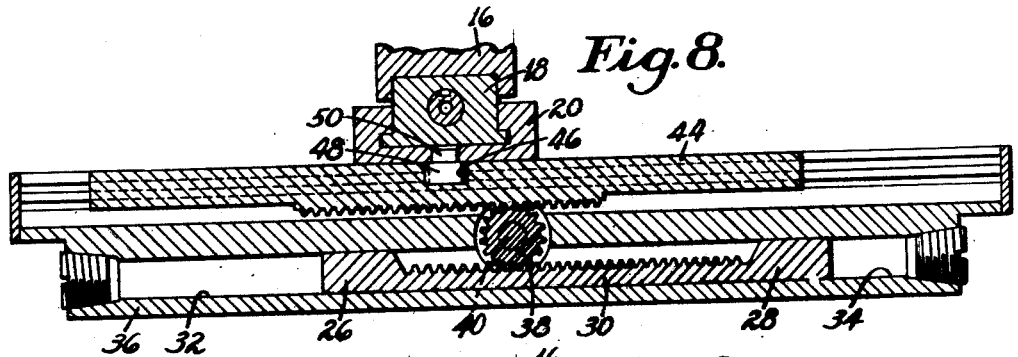
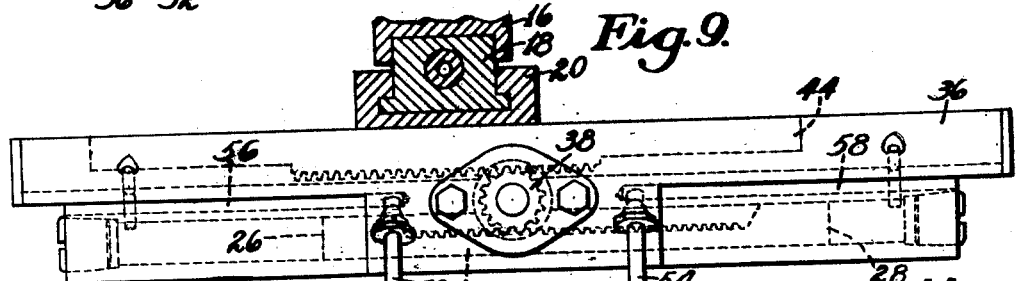
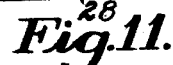
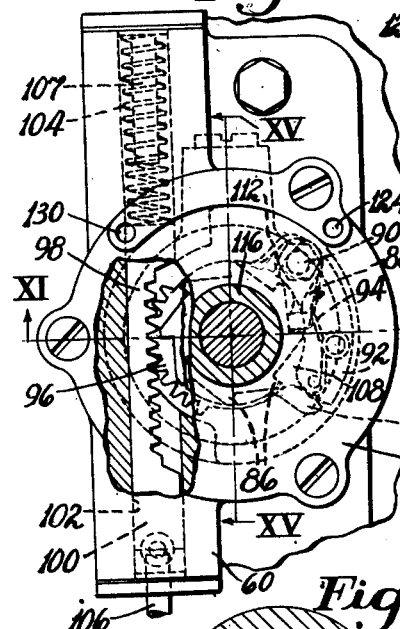
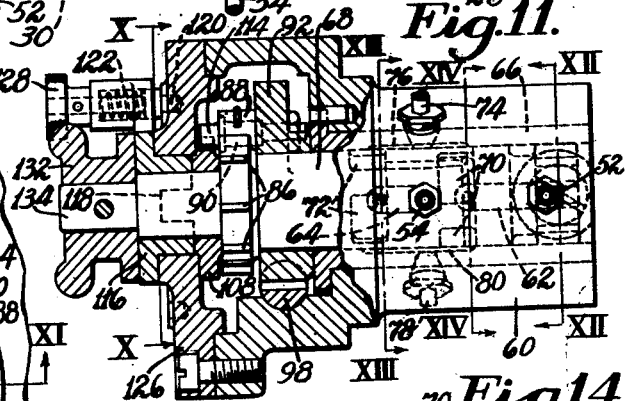
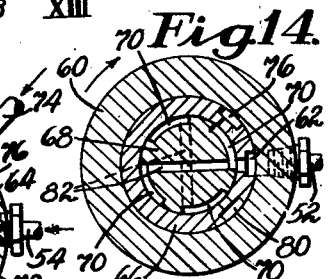
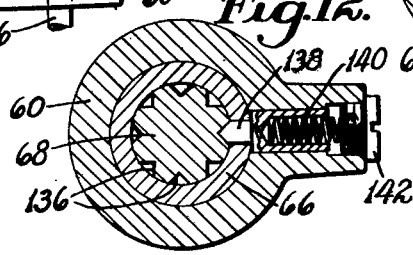
Inventor
Jacob C. Jorgensen
By his Attorney

Patented Sept. 7, 1954

2,688,146

UNITED STATES PATENT OFFICE 2,688,146

MACHINE FOR SHAPING UPPERS OVER LASTS

Jacob C. Jorgensen, Beverly, Mass., assignor to United Shoe Machinery Corporation, Flemington, N. J., a corporation of New Jersey Application February 7, 1951, Serial No. 209,870

37 Claims. (Cl. 12—10.4)

This invention relates to machines for use in the manufacture of shoes for shaping uppers over lasts, and in most aspects more particularly to the relative positioning of right and left shoes and the upper-shaping means for the upper-shaping operation. The invention is herein shown as applied to a pulling-over machine constructed as disclosed in a copending application of mine Serial No. 332,238, filed on January 21, 1953, the machine having fluid-operated means for pulling the upper over the last and for performing certain other operations. It is to be understood, however, that in various novel aspects the invention is not thus limited in its applicability.

Pulling-over machines are commonly provided with grippers which grip and pull the upper respectively at the end of the toe and the opposite sides of the forepart. Right and left shoes are commonly so presented to such a machine that the heel end of a right shoe is more or less laterally displaced from what may be termed a central plane toward one side of the machine and the heel end of a left shoe is similarly displaced toward the other side of the machine. The present invention provides novel means whereby a heel rest engaging the heel end of each right or left shoe is utilized to determine definitely the extent of such displacment and thereby to cause the foreparts of the shoes to assume the best positions for the operations performed thereon. In the construction shown a bar supporting the heel rest is swung by fluid-pressure means to carry the heel rest laterally to different predetermined positions for right and left shoes, the heel rest being moved relatively to the bar by other fluid-pressure means into engagement with the heel end of each shoe after the shoe has been presented to the machine. The operator is thus enabled to present each right or left shoe approximately in the desired position without reference to the heel rest, after which the heel rest upon engagement with the shoe will correct, if necessary, the position of the shoe. The construction shown is further such that if the machine is to operate on right and left shoes alternately the heel rest is swung laterally near the end of one cycle of operations of the machine to the position appropriate for a right shoe and near the end of the next cycle to the position appropriate for a left shoe. The fluid-pressure means for thus swinging the heel rest may, however, be so controlled that during successive cycles of operations the heel rest will be held either in the position appropriate for right shoes or in that appropriate for left shoes.

Since the outer side face of the forepart of a right or a left shoe extends generally lengthwise of the shoe at a greater angle to the longitudinal median line of the forepart than the inner side face, it is desirable that the opposite side grippers also be differently positioned for right and left shoes, especially if each of these grippers includes, as herein shown, two pairs of gripper jaws spaced from each other lengthwise of the shoe. The construction shown, therefore, includes means for automatically swinging or turning the side grippers, simultaneously with the positioning movements of the heel rest, about axes extending heightwise of the shoes through the grippers to positions appropriate for operating on right and left shoes. Since it is also desirable that the jaws of the toe gripper shall be located in the same relation to the toe end of each shoe widthwise thereof, whether the shoe be a right shoe or a left shoe, mechanism is further provided for shifting the toe gripper a short distance widthwise of the machine simultaneously with the swinging movements of the side grippers. The provision thus afforded for shifting the toe gripper renders it unnecessary to move the heel rest laterally as far as would otherwise be required.

Power-operated pulling-over machines are commonly so constructed that after the pulling of the upper by the grippers the machine comes to a stop with the upper held under tension to permit the operator to inspect the shoe and to make any adjustment of the forepart of the upper relatively to the last that may be necessary. Such adjustment of the upper may include the shifting of its forepart widthwise of the last by relative movements of the side grippers, the force of the pull on the upper being more or less relieved to facilitate this operation. In order that under these conditions the last will be held firmly against displacement, the invention further provides means associated with the heel rest for clamping the shoe at the opposite sides of its heel-end portion. In the construction shown this clamping means comprises a pair of opposite side clamps carried by a heel-rest support which is moved lengthwise of the shoe to apply the heel rest to the shoe, together with fluid-pressure means for swinging the clamps inwardly into shoe-engaging positions in response to a short further movement of the heel-rest support after the movement of the heel rest has been stopped by its engagement with the shoe. Since the clamps are thus applied to the shoe prior to any substantial pulling of the upper by the grippers, controlling means is provided for thereafter relieving momentarily their pressure on the upper and for then causing them again to apply the full pressure to the upper in the course of the upper-pulling operation, thus insuring that the force of the pull of the grippers on the upper will be properly effective on the portions of the upper at the sides of the heel end of the last as well as on other portions. This controlling means comprises a piston valve carried by the heel rest support and movable automatically by fluid pressure thus to control the pressure of the fluid effective on the clamps.

In the machine herein shown the position of the shoe and last lengthwise when the shoe is presented to the machine is determined by engagement of the toe gripper with the toe-end face of the last, the gripper being held in position thus to serve as a stop for the last. In general accordance with the manner of operation of well-known prior pulling-over machines the toe gripper, in its upper-pulling movement heightwise of the last, has also a movement lengthwise of the last in the direction to space the upper from the toe-end face of the last. To afford better insurance that the shoe will not be displaced lengthwise from the position thus determined by the toe gripper when the heel rest is moved into engagement therewith, the invention further provides means for delaying the movement of the toe gripper lengthwise of the last until it has received a portion of its movement heightwise of the last, so that it remains longer than it otherwise would in position to serve as a stop for the last. For the purpose in view the construction herein shown comprises a member having a cam face thereon and mounted on the gripper to move therewith, another member arranged to engage the cam face to impart to the gripper its movement lengthwise of the last in response to its movement heightwise of the last, and means for preventing movement of the first-named member with the gripper until after the beginning of the upper-pulling movement of the gripper heightwise of the last and for thereby delaying its movement lengthwise of the last.

The above and other features of the invention, including various novel details of construction and combinations of parts, will now be more particularly described with reference to the accompanying drawings and thereafter pointed out in the claims.

In the drawings,

Fig. 4a is a view in the direction of the arrow IVa in Fig. 4 of a portion of the structure, with parts broken away;

Fig. 5 is mainly a section substantially on the line V—V of Fig. 3;

Fig. 6 is a view similar to Fig. 5 of a portion of the structure, with certain parts in a different relation to one another than in Fig. 5;

Fig. 7 is a view similar to Fig. 6, with parts in a still different relation;

Fig. 8 is a section substantially on the line VIII—VIII of Fig. 3;

Fig. 9 is a view in the direction of the arrow IX in Fig. 1 of certain parts shown in Fig. 8, with other parts in section as in Fig. 8;

Fig. 10 is a view mainly in end elevation of valve mechanism associated with the structure shown in Figs. 8 and 9, with parts broken away and others in section on the line X—X of Fig. 11;

Fig. 11 is a view of this valve mechanism partly in inverted plan and partly in section on the line XI—XI of Fig. 10;

Figs. 12, 13 and 14 are sections on the lines XII—XII, XIII—XIII and XIV—XIV respectively of Fig. 11; and Fig. 15 is a section on the line XV—XV of Fig. 10.

Figures 1, 2:
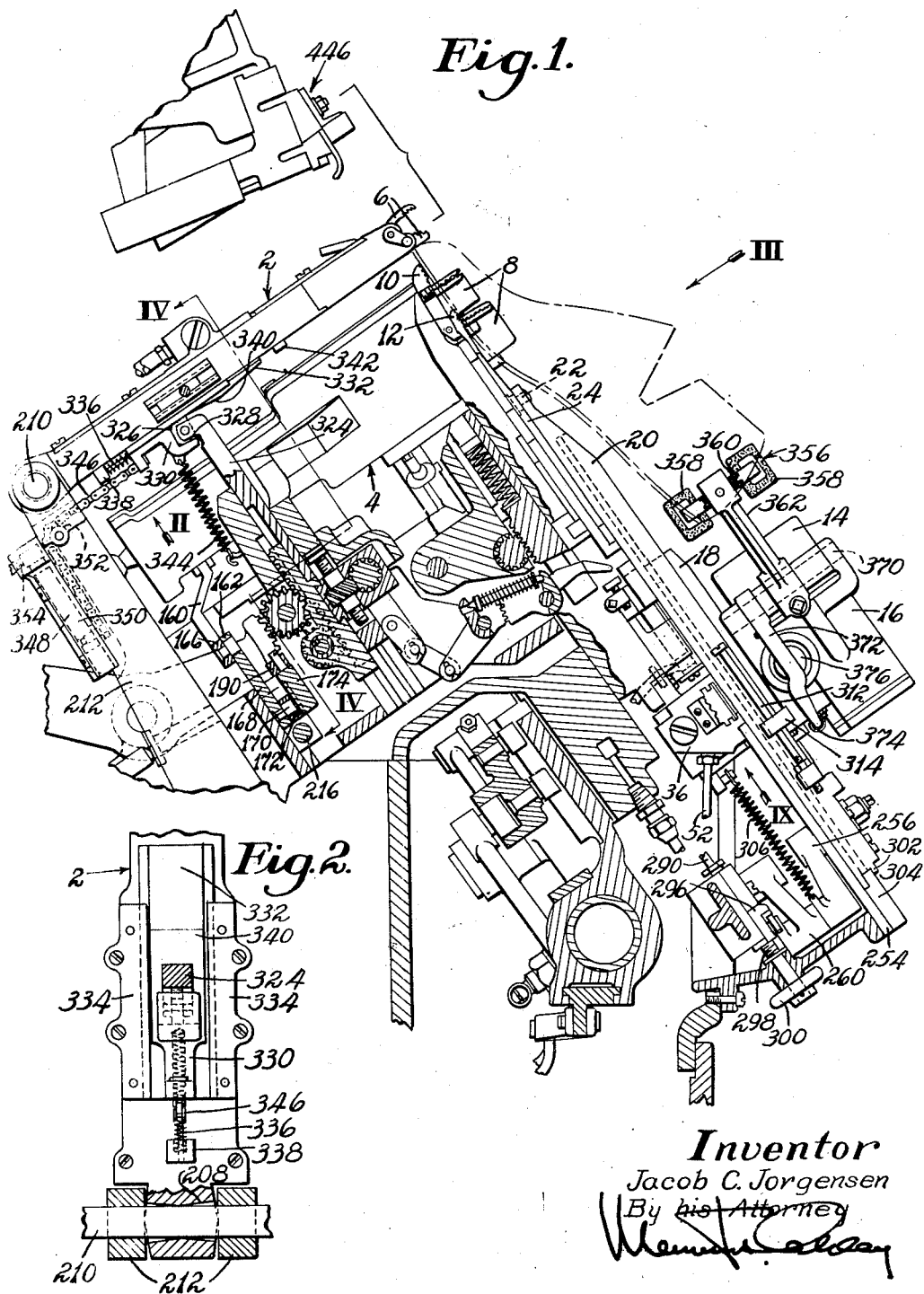
Fig. 1 is a view partly in left-hand side elevation and partly in section of a portion of the machine shown in the above-mentioned application with the present invention applied thereto.
Fig. 2 is a detail view in the direction of the arrow II in Fig. 1, with parts in section.

In view of the disclosure in the previously mentioned application, the machine to which the invention is shown as applied will be herein described only in so far as is necessary for an understanding of the invention. The machine is provided with a toe gripper 2 which grips and pulls the upper over the last at the end of the toe and with side grippers 4 which similarly grip and pull it at the opposite sides of the forepart, the toe gripper being provided with a single pair of upper-gripping jaws 6 and each side gripper with two pairs of jaws 8 spaced apart lengthwise of the shoe. The grippers are operated by fluid pressure, the operating fluid being preferably light oil which during the operation of the machine is maintained under pressure in a manifold (not shown) by a continuously running pump. By valve means the fluid under pressure is caused to flow from the manifold to operate different parts at the proper time in a cycle of operations of the machine and thereafter to return to a sump from which the pump receives the fluid.

The shoe is presented to the machine by the operator with the bottom of the forepart of the insole in engagement with a shoe rest comprising a toe presser foot 10 and two side presser feet 12 having serrated insole-engaging faces, the margin of the upper being positioned between the open gripper jaws. Substantially at the beginning of the operation of the machine, as the grippers grip and start to pull the upper, a V-shaped heel rest 14 is moved lengthwise of the shoe into engagement with the heel end of the upper. In the construction herein shown, as more particularly hereinafter described, this heel rest is carried by a block 16 which is fast on a slide 18 movable lengthwise of the shoe along a guideway formed in a bar 20. This bar is pivotally mounted at one end on a stud 22 to swing in directions widthwise of the shoe, the stud being mounted in a fixed plate 24. By such swinging movements of the bar 20 the heel rest is carried to different positions for right and left shoes respectively, so that when moved along the bar into shoe-engaging position it will differently position the heel ends of right and left shoes laterally. The stud 22 is so located that the axis of swinging movement of the bar 20 intersects each shoe in a location approximately at the intersection of the longitudinal median lines of the forepart and heel part of the shoe.

For swinging the bar 20 to carry the heel rest to its different positions there are provided two pistons 26 and 28 (Fig. 8) connected together by a rack bar 30 which is integral therewith, these pistons being movable respectively in cylinders 32 and 34 provided by the opposite end portions of a bore formed in a casting 36 fast on the frame of the machine. The rack bar 30 is in engagement with a pinion 38 formed on a shaft 40 (Fig. 5) which is journaled at one end in the casting 36 and at the other end in a bearing member 42 mounted in the casting. On its opposite side from the rack bar 30 the pinion 38 is in engagement with rack teeth formed on a slide 44 movable in directions widthwise of the shoe along guideways in the casting 36. Formed in the slide 44 is a transverse slot 46 in which lies a roll 48 mounted on a stud 50 fast in the bar 20. It will thus be seen that by movement of the pistons 26, 28 in one direction or the other in response to the admission of operating fluid to the cylinder 32 or 34 movement in the opposite direction is imparted to the slide 44 to swing the bar 20 and thereby to carry the heel rest to one or the other of its positions for right and left shoes respectively. Such movements of the heel rest to different positions are adjustably limited by means hereinafter described.

Operating fluid is admitted to the cylinders 32 and 34 respectively and is exhausted therefrom through pipes 52 and 54 (Fig. 9) which are in communication respectively with passageways 56 and 58 formed in the casting 36 and leading to the outer ends of the cylinders. These pipes lead to a valve housing 60 (Figs. 11, 13, 14 and 15) and are in communication respectively with passageways 62 and 64 formed in a sleeve 66 fast in the housing. Rotatably mounted in this sleeve is a valve 68 which has in its periphery a series of four recesses 70 arranged to communicate in succession with the passageway 62 and a series of four recesses 72 arranged to communicate in succession with the passageway 64. Leading from the manifold to the valve housing 60 is a pipe 74 which is in communication with a passageway 76 in the sleeve 66, this passageway being arranged to communicate with both series of recesses 70 and 72, and leading from the valve housing for the exhaust of fluid to the sump is an exhaust pipe 78 in communication with a passageway 80 in the sleeve, this passageway also being arranged to communicate with both series of recesses. By reference to Figs. 13 and 14 it will be seen that, with the valve 68 in the position shown, the cylinder 32 is in communication through the pipe 52, the passageway 62 and one of the recesses 70 in the valve with the passageway 76 and the pipe 74 leading from the manifold, and accordingly fluid under pressure has operated the piston 26 to swing the bar 20 to the position shown in Fig. 3. At the same time the cylinder 34 is in communication through the pipe 54, the passageway 64 and one of the recesses 72 in the valve with the passageway 80 and the exhaust pipe 78. In order to swing the bar 20 to the right to cause it to carry the heel rest to its other position the valve 68 is turned by means hereinafter described in the direction of the arrow through an eighth of a revolution. By this movement of the valve communication between the pipe 52 and the inlet pipe 74 is interrupted and is established between the pipe 52 and the exhaust pipe 78. At the same time communication is interrupted between the pipe 54 and the exhaust pipe and is established between the pipe 54 and the inlet pipe 74, thus causing fluid from the manifold to be admitted to the cylinder 34 while fluid is exhausted from the cylinder 32. It will be understood that in response to the next movement of the valve in the same direction fluid is admitted again to the cylinder 32 and is exhausted from the cylinder 34. In this manner the heel rest is swung alternately to its different positions in response to successive turning movements of the valve. In order to prevent fluid under pressure from being trapped and held in the recesses 70 and 72 when those recesses are in the idle portions of their paths of movement within the sleeve 66, the valve has extending diametrically through it passageways 82 connecting together the recesses 70 located on opposite sides of the valve and other passageways 84 connecting together the recesses 72 which are on the opposite sides of the valve.

For turning the valve 68 it has formed thereon within a recess in the housing 60 a series of eight ratchet teeth 86 (Figs. 10 and 11) arranged to be engaged by a pawl 88 pivotally mounted on a pin 90 which is fast in a pawl carrier 92 freely mounted on a cylindrical portion of the valve, the pawl being pressed inwardly toward the teeth by a spring 94. A portion of the pawl carrier serves as a gear sector 96 engaged by a rack bar 98 which has integral with its lower end a piston 100 vertically movable in a cylinder 102 formed in the housing 60. The piston 100 is moved upwardly to turn the valve 68 the required distance against the resistance of a return spring 104 bearing on the upper end of the rack bar 98 by fluid admitted to the lower end of the cylinder 102 through a pipe 106. The shifting of the heel rest from one position to the other takes place near the end of the cycle of operations of the machine after the release of the shoe, preparatory to the operation of the machine on the next shoe, and the pipe 106 is, for this purpose, conveniently arranged to communicate with a fluid-pressure line of the pulling-over machine to which fluid under pressure is admitted at that time. To limit as required the movement of the valve a pin 107 within the spring 104 is arranged to be engaged by the upper end of the rack bar 98. For limiting the return movement of the pawl carrier 92 there is freely mounted on a reduced cylindrical portion of the valve a sleeve 108 which has formed thereon two lugs 110 and 112 (Fig. 10). With the sleeve 108 in the position shown the lug 112 is arranged to engage an end portion 114 (Fig. 11) of the pin 90 on which the pawl 88 is mounted to limit the return of the carrier by the spring 104 when the fluid is released from the cylinder 102. The sleeve 108 is held normally in the position shown by another sleeve 116 freely mounted on the reduced portion of the valve 68 and having an interlocking connection 118 with the sleeve 108, the sleeve 116 being provided with a pin 120 normally held by a spring 122 in a hole 124 (Fig. 10) formed in a cap 126 which is secured on one end of the housing 60 and has therein a bearing for the sleeve 116.

Instead of operating on right and left shoes alternately, it may sometimes be desired to operate successively on a plurality of right shoes or a plurality of left shoes. In that case the heel rest should not be shifted alternately to different positions, but should remain in the position appropriate for right shoes or in that appropriate for left shoes. By means, therefore, of a knob 128 on the outer end of the pin 120 the pin may be withdrawn from the hole 124 and the sleeves 116 and 108 may be turned in a counterclockwise direction with reference to Fig. 10 to positions where the pin 120 enters another hole 130 in the cap 126. In this manner the lug 110 on the sleeve 108 is carried substantially into engagement with the end portion 114 of the pin 90, in which position it will prevent turning movement of the pawl carrier 92 and accordingly turning movement of the valve 68 when pressure is applied to the lower end of the piston 100. In case the heel rest does not happen to be in the position appropriate for the shoes, whether rights or lefts, which it is desired to operate upon when the pawl carrier 92 is thus immobilized, the valve 68 may be turned manually the proper distance to cause it to assume that position by means of a knob 132 fast on a stem 134 formed on the end of the valve. It will be understood that when the valve is thus turned by the knob, one of the teeth 86 is carried idly past the pawl 88. To determine the proper position to which the valve is turned by the knob 132, it has formed in the opposite end thereof from the stem 134 V-shaped recesses 136 (Fig. 12) arranged to receive the complementally shaped end of a detent 138 slidingly mounted in the housing 60 and the sleeve 66 and pressed inwardly by a spring 140 confined by a member 142 threaded in the housing. This detent also serves to hold the valve against displacement from each position to which it is turned by the piston 100.

Figure 3:
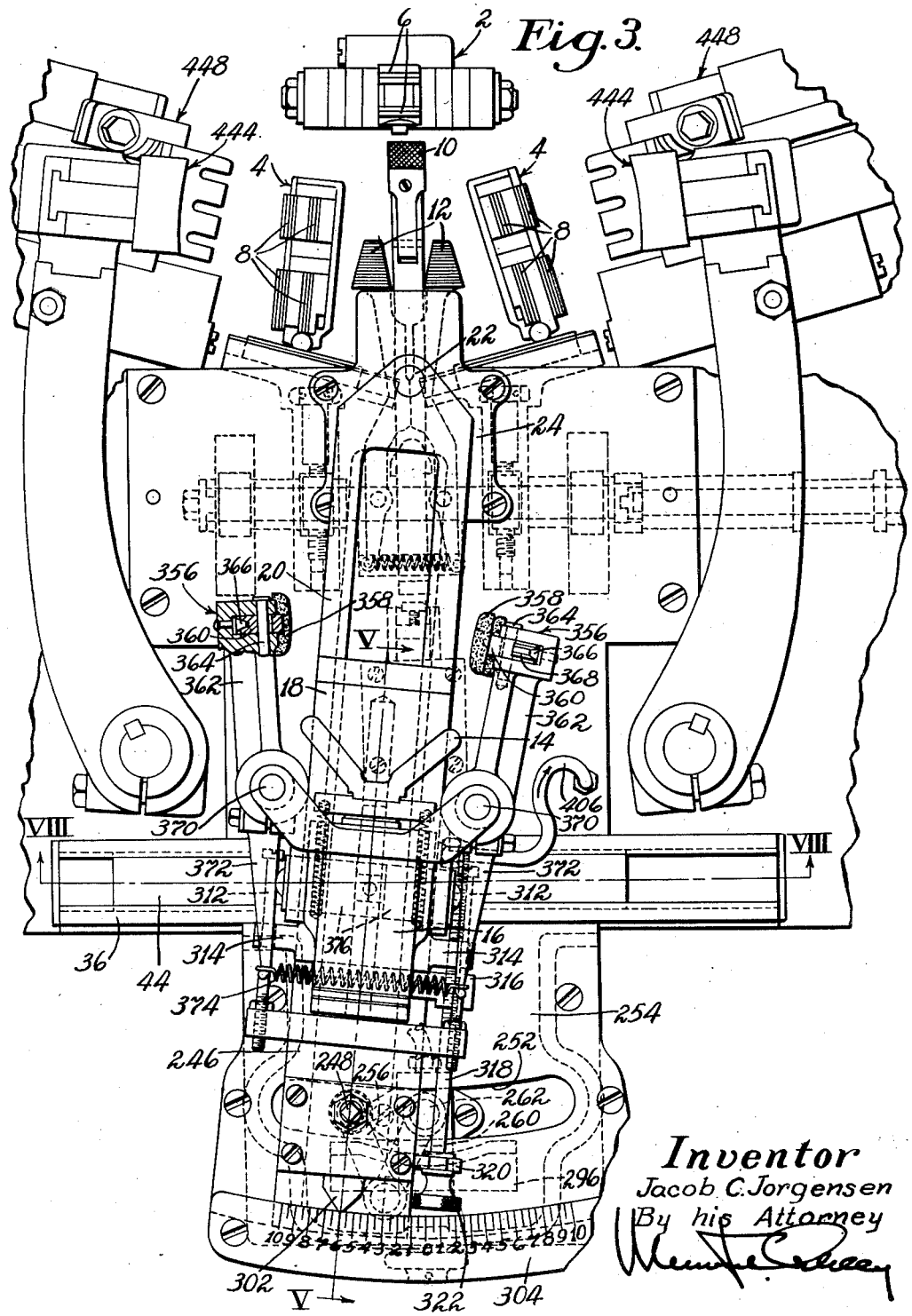
Fig. 3 is a view in the direction of the arrow III in Fig. 1.
Figure 4:
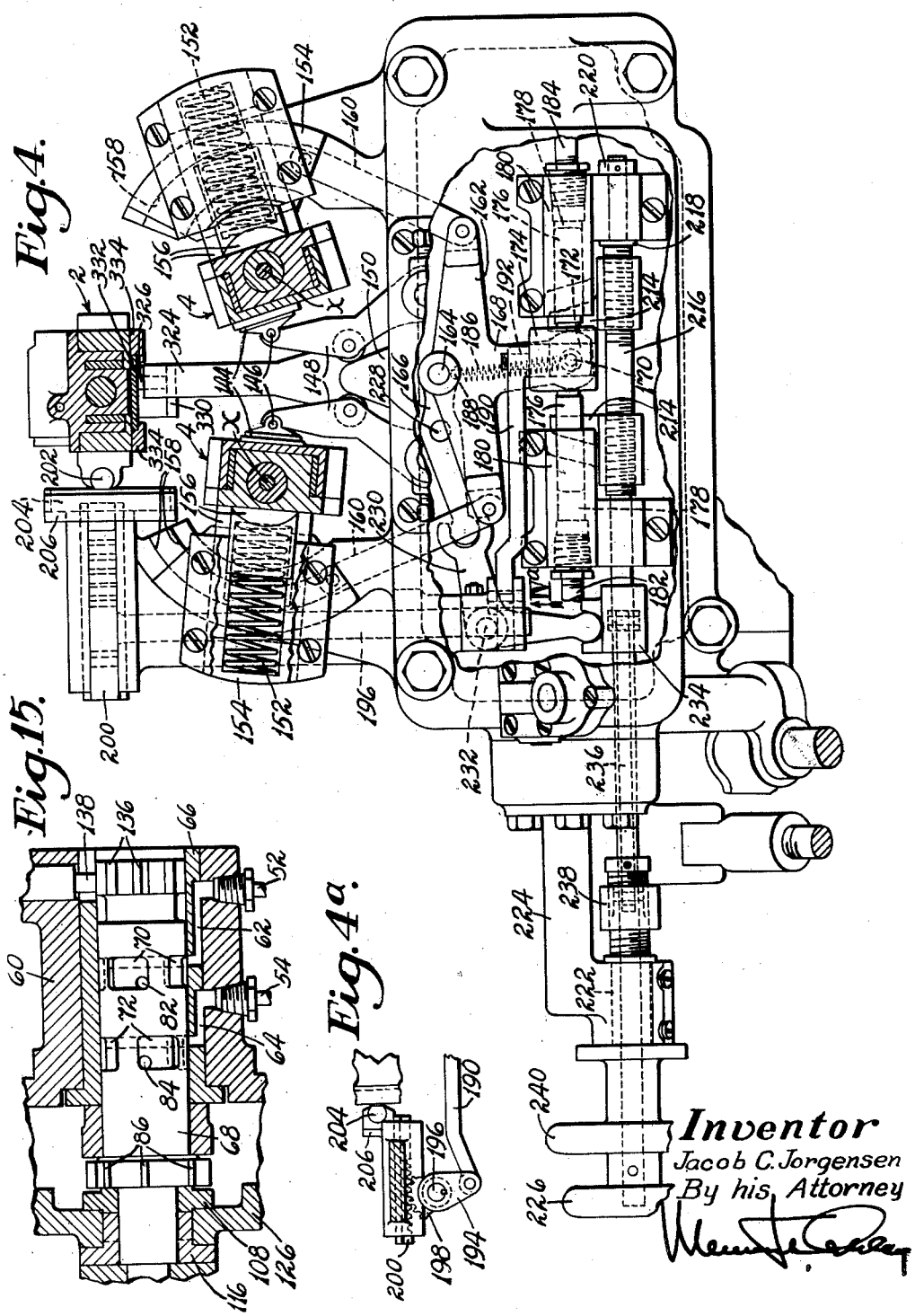
Fig. 4 is a view also in the direction of the arrow III in Fig. 1 of a portion of the structure, with parts broken away and others in section on the line IV—IV of Fig. 1.

In view of the fact that the outer side face of the forepart of a right or a left shoe extends generally lengthwise of the shoe at a greater angle to the longitudinal median line of the forepart than the inner side face, provision is afforded in the construction herein shown not only for differently positioning the heel rest laterally for right and left shoes as above described, in view of the lateral "swing" of each last, but also for differently positioning the opposite side grippers for right and left shoes by swinging or turning them about axes extending heightwise of the shoes. As shown in Fig. 4 and as more fully described in the previously mentioned application, each side gripper 4 is engaged on its inner face by a member 144 pivotally mounted by means of a pin 146 on an arm 148 which is mounted to swing in directions widthwise of the shoe, the two arms 148 being controlled by a wedge member 150 which determines the distance between the side grippers and by its movements causes them to move inwardly toward each other after they release the upper and to be later returned to their initial positions. Such inward movements of the grippers toward each other are effected by springs 152 mounted in blocks 154, these blocks having therein guideways for slides 156 which are pressed by the springs against the outer faces of the grippers. The blocks 154 are mounted in arcuate guideways 158 formed in portions of the frame of the machine, each of these guideways being curved about an axis $x$ extending heightwise of the shoe through the corresponding gripper when the gripper is in its initial position. The blocks 154 are connected respectively by links 160 to the opposite ends of a lever 162 which by means of a stud 164 is pivotally mounted midway between its opposite ends on one arm of a lever 166 hereinafter more particularly referred to. The lever 162 includes a third arm 168 connected by a pin 170 to a block 172 shown in dotted lines in Fig. 4, this block being mounted in a guideway in a larger block 174 integral with the opposite sides of which are pistons 176 movable in cylinders 178 formed in blocks 180 fast on the frame. Pipes 182 and 184 leading respectively from the outer ends of the different cylinders 178 are in communication respectively at points not shown with the pipes 52 and 54 (Fig. 9) to which fluid is admitted as hereinbefore described by the valve 68 to shift the heel rest laterally. The side grippers, therefore, are swung or turned about their axes $x$ to positions appropriate for their operation on a right or a left shoe simultaneously with the swinging movement of the heel rest to the position appropriate for that shoe, the movements of the grippers resulting from the movements of the blocks 154 by reason of the pressure of the slides 156 on the grippers. As shown in the drawings the parts are positioned as required for a right shoe, the left-hand double side gripper 4 being arranged to extend lengthwise of the shoe in more nearly parallel relation to the longitudinal median line of the forepart of the shoe than the right-hand side gripper, as illustrated especially in Fig. 3. It will be understood that in operating on a left shoe the positions of the side grippers will be reversed. At all times when there is pressure in the manifold there is pressure in one or the other of the cylinders 178, and this pressure will hold the grippers in the positions to which they have been shifted. In order that they will remain in such positions when the machine is idle and there is no pressure in the manifold, there is provided a spring 186 (Fig. 4) one end of which is connected to a pin 188 on the frame and the other end to the pin 170 at the outer end of the arm 168. This spring is so arranged relatively to the arm 168 that it tends to hold the lever 162 in either position to which it is swung by the fluid-pressure means.

It is desirable, for the best results, that the jaws of the toe gripper 2 shall be located in the same relation to the toe end of each shoe widthwise thereof whether the shoe be a right shoe or a left shoe. In order to avoid the necessity for swinging the heel rest laterally so far as would be required to position the toe ends of right and left shoes thus in the same relation to the toe gripper, provision is afforded for shifting this gripper a short distance widthwise of the machine simultaneously with the shifting movements of the side grippers. For this purpose a link 190 is pivotally connected to a pin 192 on the block 174 and to an arm 194 (Fig. 4a) fast on one end of a rockshaft 196 mounted in bearings in the frame. Fast on the other end of this rockshaft is a gear sector 198 in engagement with a rack bar 200 (Fig. 4) which is slidingly movable in a guideway in the frame in directions widthwise of the machine. This rack bar is connected to one side of the gripper 2 by members 202 and 204 which are pivotally connected together and are mounted respectively in guideways extending substantially at right angles to each other in the side of the gripper and in a guiding portion 206 of the rack bar. It will be understood that this connection permits movements of the gripper both heightwise and lengthwise of the shoe. To permit the gripper to be swung laterally by the connections thus provided between it and the block 174, the gripper is provided in its lower end with a recess 208, formed as shown in Fig. 2, through which extends a pin 210 connecting the gripper to an operating lever 212 (Fig. 1) by which it is moved heightwise of the shoe to pull the upper.

For adjustably limiting the shifting movements of the opposite side grippers and the toe gripper there are provided stops 214 (Fig. 4) arranged to be engaged by an end portion of the arm 168 of the lever 162 in locations below the block 174. These stops are connected respectively by right and left threads to a rod 216 on which they are mounted, this rod being rotatable in bearings in the previously mentioned blocks 180 and being held against lengthwise movement by engagement of one of these blocks with a flange 218 formed on the rod and a collar 220 fast on the rod. The rod 216 further extends through a sleeve 222 hereinafter referred to, this sleeve being mounted in a bearing in a bracket 224 fast on the frame. On its outer end the rod 216 has thereon a knob 226 for turning it. It will be understood that by such movement of the rod the stops 214 are adjusted equal distances toward or from each other.

Combined with the means above described for shifting the side grippers to different positions for right and left shoes by swinging movements of the lever 162 is means for moving the two blocks 154 simultaneously in rearward or forward directions along the guideways 158 to change the angular relation of the side grippers to each other in the manner disclosed in the previously mentioned application. It is for this purpose that the lever 162 is pivotally mounted by means of the stud 164 on one arm of the lever 166, this lever being pivotally mounted between its opposite ends on a stud 228 on the frame. The other arm of the lever 166 is connected in the manner illustrated in Fig. 4 to one arm of a bell-crank lever 230 pivotally mounted at 232 on the frame, the other arm of this bell-crank lever being connected to a block 234 slidingly movable on the rod 216. This block is connected by a link 236 to a nut 238 which is threaded on a portion of the previously mentioned sleeve 222, this sleeve being rotatable by a hand wheel 240 which is fast thereon and is mounted on the rod 216 between the knob 226 and the bracket 224. It will be understood that by turning this hand wheel the nut 238 is caused to travel along the sleeve 232 and, through the link 236, to move the block 234 along the rod 216. As the block is thus moved it swings the bell-crank lever 230 and the latter swings the lever 166 to carry the lever 162 bodily in a rearward or a forward direction to adjust the side grippers as described, the arm 168 carrying the block 172 with it along the guideway in the block 174.

The slide 18 which is movable along the bar 20 to carry the heel rest 14 into engagement with the shoe is formed to provide therein a cylinder 242 (Fig. 5) into which extends a piston 244 formed as part of a casting 246, this casting being secured to the bar 20 to swing with the bar widthwise of the machine. Mounted in the casting 246 is an elongated stud 248 which is diametrically enlarged below the casting and is secured to the latter by a nut 250. This stud extends downwardly through the bar 20 and through a slot 252 (Fig. 3) formed in a plate 254 which is fast on the frame of the machine and serves as a support for the front end portion of the bar 20. Mounted to swing about the lower end portion of the stud 248 is one end of an arm 256 the other end of which has extending downwardly therefrom a stem 258. On this stem is rotatably mounted one end of an arm 260, the other end of this arm being rotatably mounted on a stud 262 extending upwardly from a member 264 fast on the frame of the machine. It will thus be seen that the arms 256 and 260 are arranged similarly to a toggle and swing relatively to each other in response to the swinging movement of the bar 20. As illustrated in Fig. 3, when the bar 20 is at the limit of its movement toward the left the arm 256 is in angular relation to the arm 260, the stud 248 being positioned farther to the left than the stud 262. When the bar is swung toward the right to its limit of movement in that direction the arm 256 crosses over the arm 260 and assumes the same angular relation to the latter, but with the stud 248 at the right of the stud 262.

Fluid is conducted to the cylinder 242 to operate the slide 18 through a bore 266 in the piston 244, this bore being in communication with an annular recess 268 which is formed in the casting 246 around the stud 248 and which communicates through a port 270 with a passage 272 in the stud. This passage is in communication, through a port 274 in the stud, with an annular recess 276 in the arm 256, and passages 278 and 280 in the arm 256 and its stem 258 lead from the annular recess 276 to a similar recess 281 in the arm 260 around the stem 258. This annular recess is in communication, through a passageway 282 in the arm 260, with a similar recess 284 in the arm around the stud 262, this recess communicating through a port 286 in the stud with a passage 288 in the stud which is in communication with a pipe 290. Regardless, therefore, of the swinging movements of the bar 20 the bore 266 in the piston 244 is at all times in communication with the pipe 290. Fluid from the manifold is admitted to the pipe 290 to move the heel rest into engagement with the shoe at the required time by valve means not herein shown. Leakage of the fluid from the passageways in the arms 256 and 260 is prevented by suitable packing around the stud 248, the stem 258 and the stud 262, one such packing associated with the stud 248 being shown at 292.

To limit the swinging movement of the bar 20 in each direction there is mounted on the arm 260 a roll 294 (Fig. 5) arranged to engage a curved front face on a stop block 296 (see also Fig. 3) mounted on the member 264. When the arm 256 crosses over the arm 260 the roll is out of engagement with the stop block, but as the arm 256 continues its swinging movement in either direction the swinging of the arm 260 causes the roll 294 to approach the curved face of the stop block until by engagement with this face it limits the movement of the bar 20. To vary equally the limits of movement of the bar in opposite directions the stop block 296 is guided for forward and rearward adjusting movements on the member 264, the block being thus adjusted by a screw 298 which is threaded therein. This screw is journaled in a bearing in the frame and has thereon a hand wheel 300 (Fig. 1) for turning it. A pointer 302 (Fig. 3) carried by the bar 20 is arranged to indicate by reference to a numbered scale on a plate 304 which is fast on the plate 254 the positions assumed by the bar in accordance with the adjustment of the block 296. To insure that the bar 20 will remain in the position to which it has been swung when the machine is idle, a spring 306 is connected to a pin 308 (Fig. 5) on the bearing member 42 and to a projection 310 formed on the arm 256 near its connection with the arm 260. It will be evident that the tendency of this spring is to spread the two arms apart and therefore to prevent lateral displacement of the bar 20.

In order to limit movement of the slide 18 by the operating fluid if the machine is operated in the absence of a shoe, two rods 312 (Figs. 1 and 3) are threaded in portions of the casting 246 and extend through lugs 314 on the sides of the slide 18, movement of the slide being limited by engagement of these lugs with heads on the rods. To limit return movement of the slide, which is effected by gravity, a stop block 316 (Fig. 5) is arranged to be engaged by the front face of the block 16 on the slide. This stop block is adjustable by a screw 318 (Fig. 3) which is threaded therein and is journaled at its rear end in the bar 20 and near its front end in a lug 320 on the casting 246. On the front end of the screw is a knob 322 for turning it. By engagement of the lug 320 with the knob 322 and with a flange on the screw at the opposite side of the lug from the knob the screw is held against lengthwise movement.

The toe gripper 2 (Figs. 1 and 2) is controlled with respect to swinging movements lengthwise of the shoe about the pin 210 on the lever 212 by a slide 324 which corresponds to a similar slide shown for the same purpose in the previously mentioned application. By mechanism constructed as shown in that application, which need not be herein described in detail, this slide is retracted in proper time relation to the upper-pulling operation to cause the toe gripper to swing inwardly and thus to make way for means provided for wiping the upper over the insole and fastening it to the insole, the slide being thereafter moved in the opposite direction to return the gripper. In the construction herein shown the toe gripper is used as a stop to determine the position of the shoe lengthwise when the operator presents it to the machine, the inner of the two jaws 6 of the gripper engaging the toe-end face of the last for this purpose, as illustrated in Fig. 1. In order to hold the gripper at this time, so that it will thus serve as a stop, the slide 324 in the construction shown has a downturned rear end portion on which is pivotally mounted a block 326 positioned initially in a recess 328 formed in a member 330, this member being part of a slide 332 mounted on the gripper to move relatively thereto in directions heightwise of the shoe and confined by gibs 334 on the gripper. A compression spring 336 extending into a recess in the member 330 and seated in a lug 338 on the gripper tends to move the member 330 and the slide 332 upwardly and holds the member 330 initially in a position in which the block 326 is in the recess 328. The slide 332 has thereon a cam face 340 which, by engagement with the block 326, causes the gripper to swing a short distance in a rearward direction in the upper-pulling operation to apply to the toe end of the upper a pull lengthwise as well as heightwise of the last, the front wall of the recess 328 engaged by the block 326 being inclined in substantially parallel relation to the face 340. At the beginning of the upper-pulling operation, however, the gripper moves in a direction substantially at right angles to the bottom face of the toe end of the shoe without any rearward swinging movement, since the member 330 and the slide 332 are held by the spring 336 against movement with the gripper, the block 326 remaining at the bottom of the recess 328. Thereafter a lug 342 on the gripper engages the upper end of the slide 332 and moves the slide with the gripper, thus causing the cam face 340 on the slide to impart the rearward swinging movement to the gripper as the pulling of the upper continues. In this operation the member 330 moves downward relatively to the block 326, the inclined inner face of the front wall of this member permitting the rearward swinigng movement of the gripper. Near the end of the upper-pulling operation the member 330 and the slide 332 are moved downward relatively to the gripper to clear the block 326 from the recess 328 and thus to prevent any possible cramping action between the gripper and the slide 324 when this slide is thereafter retracted to cause the gripper to swing inward transversely of the edge of the shoe bottom, such swinging movement being imparted to the gripper by a spring 344 connected to the member 330. For this purpose a chain 346 is connected at one end to the member 330 and at the other end to a small piston 348 mounted in a cylinder 350 on the gripper-operating lever 212, the chain being guided by a roll 352 on the lever. Fluid under pressure is admitted to the interior of the cylinder 350 at the required time through a flexible conduit connected to a port 354 in the cylinder. In the return of the parts to starting positions the block 326 again assumes its initial position in the recess 328 as the member 330 is returned by the spring 336, the piston 348 also being returned by this spring. Sufficient leeway is provided in the cylinder 350 for such movement as the piston 348 necessarily receives when the gripper moves downward relatively to the member 330 early in the upper-pulling operation.

Associated with the heel rest 14 are side clamps 356 (Figs. 1 and 3) arranged to engage the heel-end portion of the shoe on its opposite sides for a purpose hereinafter explained. Each of these side clamps comprises a pair of shoe-engaging pads 358 mounted respectively on upper and lower portions of a pad holder 360 supported on an arm 362. The pad holder is mounted on a pin 364 in the arm to permit it to swing about an axis extending lengthwise of the shoe and thus to permit the pads to adjust themselves to the shoe. To prevent the holder from swinging too freely when the pads are not in engagement with a shoe a friction pin 366 in the arm 362 engages the holder in a groove 368 formed in a curved portion of the holder.

The two arms 362 are secured to rods 370 which are mounted for turning movements in portions of the block 16. Also secured to these rods are arms 372 extending toward the front of the machine, and connected to the front ends of these arms is a spring 374 which tends to swing them toward each other and therefore to swing the clamps 356 away from each other. The arms 372 are engaged on their inner faces by the outer rounded ends of pistons 376 (Fig. 3) which are mounted in opposed relation to each other in a cylinder 378 (Fig. 5) formed in the block 16. The inner ends of these pistons engage each other to limit the movements of the arms 372 by the spring 374, but are of reduced diameter to provide an annular chamber to receive the operating fluid when the pistons are in their innermost positions.

The heel rest 14 is not mounted directly on the block 16, but on a flange 380 (Fig. 5) formed on a cylindrical sleeve 382 which is slidingly movable within another sleeve 384 mounted in fixed relation to the block 16. Within the sleeve 382 is slidingly mounted, for a purpose hereinafter explained, a piston valve 386, the sleeve 382 providing within it a cylinder 388 which is closed at one end by the heel rest member 14 and at the other end by a cap 390 secured to the block 16, this cap having a projection which fits within the sleeve. A spring 392 in the left-hand end portion of the cylinder 388, as the parts are viewed in Fig. 5, tends to move the heel rest 14 and its sleeve 382 in one direction and the piston valve 386 in the opposite direction. Such movement of the heel rest by the spring is limited by engagement of the flange 380 with a plate 394 on the block 16, and movement of the piston valve by the spring is limited by engagement of the head of a stud 396 in the valve with the cap 390. Provision is therefore afforded for further movement of the block 16 toward the shoe after the heel rest has engaged the shoe, this movement continuing until the block has engaged the flange 380, as illustrated in Fig. 6. This further movement of the block 16 and its sleeve 384 causes operating fluid to enter the cylinder 378 and to operate the pistons 376 to move the side clamps 356 inwardly against the shoe. The fluid for thus operating the pistons 376 comes from the bore 266 in the piston 244 through a port 398 and a slot 400 in this piston, communication between this slot and a passage 402 in the block 16 being established by the movement of the slide 18 to carry the heel rest toward the shoe. Initially, as shown in Fig. 5, there is no communication between the passage 402 and the cylinder 378, the cylinder being in communication with an exhaust passage 404 in the block 16 from which leads a flexible tube 406 (Fig. 3) for conducting fluid back to the sump. The exhaust of fluid from the cylinder takes place through a port 408 in the block 16 which is in communication with an annular recess 410 extending around the fixed sleeve 384. Through a series of ports 412 in this sleeve the annular recess 410 is in communication with an annular recess 414 in the movable sleeve 382, and this annular recess is in communication through a series of ports 416 in the sleeve 384 with an annular recess 418 in this sleeve which is in communication with the exhaust passage 404. These are the conditions before the heel rest engages the shoe, as illustrated in Fig. 5.

The further movement of the block 16 after the heel rest has engaged the shoe causes the sleeves 382 and 384 to assume the relation to each other illustrated in Fig. 6. It will be noted that in this figure the annular recess 414 in the sleeve 382 is no longer in communication with the exhaust passage 404 and therefore the cylinder 378 is closed to exhaust. The inlet passage 402, moreover, is in communication with the port 408 in the wall of the cylinder 378. This communication is established through a bore 420 in the piston valve 386, to which bore annular recesses and ports in the sleeves 382 and 384 and the piston valve, including ports 421 in the valve, lead from the passage 402 and from which bore lead ports 422 in the valve in communication with the annular recess 414 which is still in communication with the port 408. In response, therefore, to the further movement of the block 16 after the engagement of the heel rest with the shoe the side clamps 356 are caused to engage and clamp the heel end of the shoe between them. To permit the relative movements of the block 16 and the sleeve 382 a space 423 at the right-hand end (Fig. 5) of the sleeve is at all times in communication with the exhaust passage 404 through a port 424 in the sleeve 384, a port 426 in the block 16, a passage 428 in the block, a port 430 in the block, and the previously mentioned annular recess 418.

To insure that the portions of the upper at the opposite sides of the heel end of the last as well as other portions thereof will be subjected to the required tension by the grippers in the upper-pulling operation, provision is afforded for relieving momentarily the pressure of the side clamps 356 on the upper in the course of the upper-pulling operation and for thereafter causing them again to apply their full pressure to the upper. These results are accomplished in response to movement of the piston valve 386 within the sleeve 382. As shown in Fig. 5, initially the right-hand end of the cylinder 388 in which the piston valve is mounted is open to exhaust, since it is in communication with the passage 428 in the block 16 through annular recesses and ports in the sleeves 382 and 384 and a port 432 in the block 16. From Fig. 6, however, it will be evident that the right-hand end of the cylinder 38 is closed to exhaust by the relative movement of the block 16 and the sleeve 382 which takes place after the engagement of the heel rest with the shoe. Fluid under pressure for operating the piston valve 386 is conducted from the passage 402 through a port 434 in the block 16 past a needle valve 436 into a passage 438 in the block, and by the above-mentioned relative movement of the block and the sleeve 382 communication is opened between the passage 438 and the right-hand end of the cylinder 388 through ports and annular recesses in the sleeves 382 and 384, as will be evident by reference to Fig. 6. As soon, therefore, as the parts have assumed the relation to one another illustrated in Fig. 6 fluid begins to flow slowly past the needle valve 436 into the cylinder 388 to operate the piston valve 386. By the movement of the piston valve communication of the inlet passage 402 with the cylinder 378 is first interrupted by reason of the movement of the series of ports 421 and 422 in the valve to the left beyond the positions in which they are shown in Fig. 6, the fluid under pressure being thus trapped in the cylinder 378, and when the valve arrives in the position in which it is shown in Fig. 7 the cylinder is in communication with the exhaust passage 404 through the same annular recesses and ports in the valve, including the ports 421 and 422, by which fluid was first admitted to the cylinder. A momentary relief of the pressure of the side clamps 356 on the shoe thus results. As the valve passes beyond the position in which it is shown in Fig. 7 the ports 422 are no longer in communication with the exhaust passage 404, although the ports 421 remain in communication with the cylinder 378, and simultaneously communication between the cylinder and the inlet passage 402 is again established through the ports 421 and through ports 440 in the valve which are then in communication with the passage 402 as were previously the ports 421. Full pressure of the side clamps 356 on the shoe is thus again established as the valve 386 completes its movement. The movement of the valve is limited by engagement of its left-hand end with that portion of the heel rest member 14 which extends into the cylinder 388. To permit movement of the valve as described the left-hand end of the cylinder is in communication with the exhaust passage 404 through a series of ports 442 in the sleeve 382.

Near the end of the upper-pulling operation, after the pressure of the side clamps 356 on the shoe has been relieved and again fully applied as above described, the valve means (not shown) previously referred to for controlling flow of fluid through the pipe 290 to operate the heel rest and the side clamps is caused to interrupt communication of the manifold with the cylinder 242, so that the fluid is trapped in this cylinder as well as in the cylinder 378. Accordingly, the fluid controlling the heel rest has no tendency to displace the shoe lengthwise when the force of the pull of the grippers on the upper is relieved to facilitate adjustment of the forepart of the upper relatively to the last, as it may be after the machine comes to a stop with the upper held under tension, and when later the grippers release the upper to permit its margin to be wiped inwardly over the insole and secured to the insole. At the same time the fluid confined in the cylinder 242 locks the heel rest positively against any reverse movement in response to pressure of the heel end of the shoe thereon. When the forepart of the upper is thus adjusted, the side clamps 356 assist in holding the last against displacement. Near the end of the cycle the above-mentioned valve means releases the fluid in the cylinder 242, whereupon the block 16 and the slide 18 are returned to their initial positions by gravity. It will be understood that in response to such relief of the pressure in the cylinder 242 the pressure of the side clamps 356 on the shoe is immediately relieved, after which the spring 392 returns the heel rest and the piston valve 386 to their initial positions relatively to the block 16. The return of the sleeve 382 attached to the heel rest releases the fluid from the cylinder 378 and also from the right-hand end (Fig. 5) of the cylinder 388.

The manner of operation of the construction provided by the present invention will now be briefly summarized. Initially the heel rest is positioned laterally either for a right shoe or for a left shoe, the position in which it is shown in Fig. 3 being that required for a right shoe. If the machine is to operate alternately on right shoes and left shoes, the operator makes certain that the sleeve 108 carrying the stop lugs 110 and 112 is positioned as shown in Figs. 10 and 11, so that near the end of each cycle the valve 68 will be turned to cause the shifting of the heel rest. If it is desired, however, to operate on a plurality of right shoes or a plurality of left shoes in succession, the operator turns the sleeve 108 by means of the knob 128 into position to cause its lug 110 to prevent the turning of the valve when fluid pressure is applied to the piston 100. If the heel rest is not in the position appropriate for the shoe or shoes upon which it is desired to operate, the operator may turn the valve 68 by the knob 132 to the position where the detent 133 (Fig. 12) enters the next recess 136 in the valve to cause the heel rest to be swung to the desired position. It will be understood that simultaneously with each lateral movement of the heel rest the side grippers 4 are swung about their axes x to positions appropriate for the shoe to be operated upon and the toe gripper 2 also is shifted laterally to the position appropriate for that shoe.

In presenting the shoe to the machine the operator positions the toe-end face of the last against the inner jaw of the toe gripper, as illustrated diagrammatically in Fig. 1, and positions the margin of the upper materials between the open jaws of the several grippers, the bottom of the forepart of the insole engaging the shoe rest feet 10 and 12. The toe gripper, held against swinging movement lengthwise of the shoe by the slide 324, thus serves as a stop to determine the position of the shoe lengthwise in the machine. In presenting the shoe also the operator positions its heel end laterally in what he considers to be substantially the proper location required for the proper positioning of the forepart of the right or left shoe relatively to the grippers. After having thus presented the shoe and while holding it in the position in which it is presented the operator starts the cycle of operations of the machine.

Substantially at the beginning of the cycle the slide 18 (Figs. 1 and 5) is moved along the bar 20 by fluid admitted to the cylinder 242 to carry the block 16 and the heel rest 14 toward the shoe and to cause the heel rest to engage the heel end of the shoe. By such engagement the V-shaped heel rest may swing the shoe slightly in one direction or the other, thus determining definitely the position of its heel end laterally and accordingly positioning its forepart in the desired predetermined relation to the grippers. After the heel rest has engaged the shoe the movement of its supporting block 16 continues until stopped by engagement of the block with the flange 380 of the sleeve 382 (Fig. 6). In the manner hereinbefore explained in detail this causes fluid under pressure to enter the cylinder 378 and to move the side clamps 356 inwardly into clamping engagement with the sides of the heel end of the shoe. As also explained in detail, fluid is caused to enter the cylinder 388 and to move the piston valve 386 against the resistance of the spring 392, this movement of the valve to its final position causing a momentary relief of the pressure of the side clamps on the upper followed by application again of the full clamping pressure to the upper.

This momentary relief of the pressure occurs in the course of the upper-pulling operation of the grippers, thus insuring that the portions of the upper at the sides of the heel end of the shoe will be properly subjected to the force of the pull of the grippers. As the grippers are operated to pull the upper the toe gripper 2 first moves in a direction substantially at right angles to the bottom face of the toe end of the insole while still serving as a stop to prevent lengthwise displacement of the last, after which, engagement of the lug 342 (Fig. 1) on the gripper with the slide 332 causes the slide to move with the gripper. As the slide is thus moved its cam face 340, by engagement with the block 326, causes the gripper to swing a short distance rearwardly lengthwise of the shoe to apply to the upper a pull in that direction. It will be evident that in the course of its movement the toe gripper ceases to act as a stop for the toe end of the last prior to the completion of the upper-pulling operation, but by that time the force of the pull of the grippers on the upper holds the insole firmly in engagement with the serrated shoe rest feet 10 and 12 which tend to prevent lengthwise displacement of the shoe. As hereinbefore explained, moreover, the fluid is trapped in the cylinder 242 near the end of the upper-pulling operation, after the pressure of the side clamps 356 on the shoe has been relieved and again fully applied, so that there is no longer any tendency for the heel rest to displace the shoe lengthwise.

After the completion of the upper-pulling operation the machine comes to a stop with the upper held under tension by the grippers. As fully explained in the previously mentioned application, the force of the pull of the grippers on the upper may then be more or less relieved and the grippers moved to adjust the forepart of the upper as may be required to position it in proper relation to the last, after which the grippers are caused again to apply their full force to the upper. When the force of the pull is thus relieved, the side clamps 356 assist in holding the last against displacement. As also fully disclosed in the above-mentioned application, after the machine has again been started, clamping devices 444 (Fig. 3) are swung inwardly to engage and hold the shoe at the sides of the forepart, and wiping and tacking devices 446 (Fig. 1) and 448 (Fig. 3) are moved inwardly at the end of the toe and the sides of the forepart to wipe the margin of the upper over the insole preparatory to the driving of tacks to fasten the upper, the grippers being caused to release the upper in time relation to the inward movements of the wiping and tacking devices and being swung inwardly to make way for these devices. After the driving of the tacks the shoe is released and the parts are returned to starting positions. If the machine is to operate on right and left shoes alternately, the heel rest is swung laterally to the position appropriate for the next shoe and the positions of the toe and side grippers are correspondingly shifted prior to the completion of the cycle.

Having described the invention, what I claim as new and desire to secure by Letters Patent of the United States is:

1. In a machine for shaping uppers over lasts, the combination with means for shaping over right and left lasts the foreparts of the uppers of shoes on the lasts, of a heeel rest constructed and arranged to determine the position of the heel end of each right or left shoe laterally by engagement with the upper at that end of the shoe, said heel rest being mounted for lateral movements to different positions for right and left shoes respectively preparatory to its positioning action on the shoes, power-operated means for automatically moving the heel rest to one of said positions prior to the operation of the machine on one shoe and to the other of said positions prior to the operation of the machine on the next shoe, and means for moving the heel rest from either of said positions in a predetermined fixed path lengthwise of the shoe thus to engage and position the shoe.

2. In a machine for shaping uppers over lasts, the combination with means for shaping over right and left lasts the foreparts of the uppers of shoes on the lasts, of a substantially V-shaped heel rest arranged to determine the position of the heel end of each right or left shoe laterally by engagement with the upper at that end of the shoe, said heel rest being mounted for lateral swinging movements to different positions for right and left shoes respectively, power-operated means for automatically swinging the heel rest from one of said positions to the other after the operation of the machine on one shoe and for swinging it reversely to the first position after the operation of the machine on the next shoe, and additional power-operated means for moving the heel rest from either of said positions in a predetermined fixed path lengthwise of the shoe thus to engage and position the shoe.

3. In a machine for shaping uppers over lasts, the combination with means for shaping over right and left lasts the foreparts of the uppers of shoes on the lasts in cycles of power operations of the machine, of a heel rest constructed and arranged to determine the position of the heel end of each right or left shoe laterally by engagement with the upper at that end of the shoe, said heel rest being mounted for lateral movements to different positions for right and left shoes respectively, power-operated means for automatically moving the heel rest from one of said positions to the other near the end of one cycle of operations of the machine preparatory to the operation of the machine on a shoe in the next cycle and for moving it reversely to the first position near the end of the next cycle, and additional power-operated means for moving the heel rest from either of said positions in a predetermined fixed path lengthwise of the shoe thus to engage and position the shoe.

4. In a machine for shaping uppers over lasts, the combination with means for shaping over right and left lasts the foreparts of the uppers of shoes on the lasts, of a heel rest for determining the position of the heel end of each right or left shoe laterally by engagement with the upper at that end of the shoe, said heel rest being mounted for lateral movements to different positions for right and left shoes respectively, and fluid-pressure means arranged to partake of the lateral movements of the heel rest for thereafter moving it from either of said positions lengthwise of the shoe into engagement with the heel end of the shoe.

5. In a machine for shaping uppers over lasts, the combination with means for shaping over right and left lasts the foreparts of the uppers of shoes on the lasts, of a heel rest for determining the position of the heel end of each right or left shoe laterally by engagement with the upper at that end of the shoe, a support for said heel rest movable to carry it laterally to different positions for right and left shoes respectively, and a cylinder-and-piston device carried by said support for moving the heel rest by fluid pressure from either of said positions lengthwise of the shoe into engagement with the heel end of the shoe.

6. In a machine for shaping uppers over lasts, the combination with means for shaping over right and left lasts the foreparts of the uppers of shoes on the lasts, of a heel rest for determining the position of the heel end of each right or left shoe laterally by engagement with the upper at that end of the shoe, said heel rest being mounted for lateral movements to different positions for right and left shoes respectively, a cylinder-and-piston device for thus moving the heel rest to its different positions by fluid pressure, and another cylinder-and-piston device movable with said heel rest for thereafter moving it by fluid pressure from either of said positions lengthwise of the shoe into engagement with the heel end of the shoe.

7. In a machine for shaping uppers over lasts, the combination with means for shaping over right and left lasts the foreparts of the uppers of shoes on the lasts in cycles of power operations of the machine, of a heel rest for determining the position of the heel end of each right or left shoe laterally by engagement with the upper at that end of the shoe, said heel rest being mounted for lateral movements to different positions for right and left shoes respectively, fluid-pressure means for automatically moving the heel rest from one of said positions to the other in one cycle of operations of the machine and for moving it reversely to the first position in the next cycle of operations, and fluid-pressure means for moving the heel rest from either of said positions lengthwise of the shoe into engagement with the heel end of the shoe.

8. In a machine for shaping uppers over lasts, the combination with means for shaping over right and left lasts the foreparts of the uppers of shoes on the lasts, of a heel rest constructed and arranged to determine the position of the heel end of each right or left shoe laterally by engagement with the upper at that end of the shoe, said heel rest being mounted for lateral movements to different positions for right and left shoes respectively preparatory to its positioning action on the shoes, power-operated means for automatically moving the heel rest to one of said positions prior to the operation of the machine on one shoe and to the other of said positions prior to the operation of the machine on the next shoe, additional power-operated means for moving the heel rest from either of said positions in a predetermined fixed path lengthwise of the shoe thus to engage and position the shoe, and means for optionally rendering said first-named power-operated means inoperative to move the heel rest regardless of the operation of the machine on successive shoes.

9. In a machine for shaping uppers over lasts, the combination with means for shaping over right and left lasts the foreparts of the uppers of shoes on the lasts in cycles of power operations of the machine, of a heel rest constructed and arranged to determine the position of the heel end of each right or left shoe laterally by engagement with the upper at that end of the shoe, said heel rest being mounted for lateral movements to different positions for right and left shoes respectively, power-operated means for automatically moving the heel rest from one of said positions to the other in one cycle of operations of the machine and for moving it reversely to the first position in the next cycle of operations, additional power-operated means for moving the heel rest from either of said positions in a predetermined fixed path lengthwise of the shoe thus to engage and position the shoe, and means for optionally preventing the movement of the heel rest by said first-named power-operated means during successive cycles of operations of the machine.

10. In a machine for shaping uppers over lasts, the combination with means for shaping over right and left lasts the foreparts of the uppers of shoes on the lasts in cycles of power operations of the machine, of a heel rest for determining the position of the heel end of each right or left shoe laterally by engagement with the upper at that end of the shoe, said heel rest being mounted for lateral movements to different positions for right and left shoes respectively, fluid-operated means for automatically moving the heel rest from one of said positions to the other in one cycle of operations of the machine and for moving it reversely to the first position in the next cycle of operations, additional fluid-operated means for moving the heel rest from either of said positions in a predetermined fixed path lengthwise of the shoe thus to engage and position the shoe, and means for optionally preventing movement of the heel rest from either of said positions selectively by said first-named fluid-operated means during successive cycles of operations of the machine by control of the operating fluid.

11. In a machine for shaping uppers over lasts, the combination with means for shaping over right and left lasts the foreparts of the uppers of shoes on the lasts in cycles of power operations of the machine, of a heel rest for determining the position of the heel end of each right or left shoe laterally by engagement with the upper at that end of the shoe, said heel rest being mounted for lateral movements to different positions for right and left shoes respectively, fluid-operated means for automatically moving the heel rest from one of said positions to the other in one cycle of operations of the machine and for moving it reversely to the first position in the next cycle of operations, valve mechanism automatically movable to cause such movements of the heel rest by control of the operating fluid, means for optionally preventing such movement of the valve mechanism and for thereby preventing lateral movement of the heel rest during successive cycles of operations of the machine, and additional fluid-operated means for moving the heel rest from either of said positions in a predetermined fixed path lengthwise of the shoe thus to engage and position the shoe.

12. In a machine for shaping uppers over lasts, the combination with means for shaping over right and left lasts the foreparts of the uppers of shoes on the lasts in cycles of power operations of the machine, of a heel rest for determining the position of the heel end of each right or left shoe laterally by engagement with the upper at that end of the shoe, said heel rest being mounted for lateral movements to different positions for right and left shoes respectively, fluid-operated means for automatically moving the heel rest from one of said positions to the other in one cycle of operations of the machine and for moving it reversely to the first position in the next cycle of operations, a rotary valve movable to cause such movements of the heel rest by control of the operating fluid, fluid-operated means for rotating said valve in each cycle of operations, and a stop optionally movable into position to prevent rotation of the valve and thereby to prevent lateral movement of the heel rest during successive cycles of operations of the machine.

13. In a machine for shaping uppers over lasts, grippers for gripping the uppers of right and left shoes on their lasts at the opposite sides of the foreparts respectively and for pulling the uppers over the lasts, said grippers being mounted for movements to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, and a controlling member common to said grippers and heel rest for causing them thus to move to the positions appropriate for a right shoe and to the positions appropriate for a left shoe.

14. In a machine for shaping uppers over lasts, grippers for gripping the uppers of right and left shoes on their lasts at the opposite sides of the foreparts respectively and for pulling the uppers over the lasts, said grippers being mounted for movements about axes extending heightwise of the shoes to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, mechanisms associated respectively with the grippers and the heel rest for thus moving them, and a controlling member common to said mechanisms for causing them to operate in unison.

15. In a machine for shaping uppers over lasts, grippers for gripping the uppers of right and left shoes on their lasts at the opposite sides of the foreparts respectively and for pulling the uppers over the lasts, said grippers being mounted for movements to different positions for operating on right and left shoes respectively, power-operated means for thus moving said grippers, a heel rest for determining the position of the heel end of each right or left shoe laterally by engagement with the upper at that end of the shoe, said heel rest being mounted for lateral movements to different positions for right and left shoes respectively, and power-operated means for thus moving said heel rest to the position appropriate for a right or a left shoe simultaneously with the movements of said grippers to the positions for operating on that shoe.

16. In a machine for shaping uppers over lasts, grippers for gripping the uppers of right and left shoes on their lasts at the opposite sides of the foreparts respectively, said grippers being mounted for movements about axes extending heightwise of the shoes to different positions for operating on right and left shoes respectively, fluid-pressure means for thus moving said grippers, a heel rest for determining the position of the heel end of each right or left shoe laterally by engagement with the upper at that end of the shoe, said heel rest being mounted for lateral movements to different positions for right and left shoes respectively, fluid-pressure means for thus moving said heel rest, and a valve common to both said fluid-pressure means for causing simultaneous movements of the grippers and the heel rest to the positions appropriate for a right shoe or to those appropriate for a left shoe.

17. In a machine for shaping uppers over lasts, grippers for gripping the uppers of right and left shoes on their lasts at the opposite sides of the foreparts respectively and for pulling the uppers over the lasts in cycles of power operations of the machine, said grippers being mounted for movements to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, and power-operated means for thus automatically moving said grippers and heel rest in one cycle of operations of the machine to the positions appropriate for a right shoe and in the next cycle of operations to the positions appropriate for a left shoe.

18. In a machine for shaping uppers over lasts, grippers for gripping the uppers of right and left shoes on their lasts at the opposite sides of the foreparts respectively and for pulling the uppers over the lasts in cycles of power operations of the machine, said grippers being mounted for movements about axes extending heightwise of the shoes to different positions for operating on right and left shoes respectively, fluid-pressure means for thus moving said grippers in one cycle of operations of the machine to positions for operating on a right shoe and in the next cycle to positions for operating on a left shoe, a heel rest for determining the position of the heel end of each right or left shoe laterally by engagement with the upper at that end of the shoe, said heel rest being mounted for lateral movements to different positions for right and left shoes respectively, and additional fluid-pressure means for moving said heel rest in one cycle of operations into position for a right shoe and in the next cycle into position for a left shoe coordinately with the movements of the grippers to the positions for operating on the respective shoes.

19. In a machine for shaping uppers over lasts, grippers for gripping the uppers of right and left shoes on their lasts at the opposite sides of the foreparts respectively and for pulling the uppers over the lasts in cycles of power operations of the machine, said grippers being mounted for movements about axes extending heightwise of the shoes to different positions for operating on right and left shoes respectively, fluid-pressure means for thus moving said grippers, a heel rest for determining the position of the heel end of each right or left shoe laterally by engagement with the upper at that end of the shoe, said heel rest being mounted for lateral movements to different positions for right and left shoes respectively, additional fluid-pressure means for thus moving said heel rest, and valve mechanism movable in each cycle of operations to cause the grippers and the heel rest to be moved to the positions appropriate for a right shoe in one cycle and to the positions appropriate for a left shoe in the next cycle.

20. In a machine for shaping uppers over lasts, grippers for gripping the uppers of right and left shoes on their lasts at the opposite sides of the foreparts respectively and for pulling the uppers over the lasts, said grippers being mounted for movements to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, power-operated means for automatically moving said grippers and heel rest to the positions appropriate for right and left shoes alternately as an incident to the operation of the machine on successive shoes, and means for optionally rendering said power-operated means inoperative thus to move the grippers and the heel rest regardless of the operation of the machine on successive shoes.

21. In a machine for shaping uppers over lasts, grippers for gripping the uppers of right and left shoes on their lasts at the opposite sides of the foreparts respectively and for pulling the uppers over the lasts in cycles of power operations of the machine, said grippers being mounted for movements to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, power-operated means for moving said grippers and heel rest to the positions appropriate for a right shoe in one cycle of operations and to the positions appropriate for a left shoe in the next cycle of operations, and means for optionally preventing such movements of the grippers and the heel rest either from the positions appropriate for a right shoe or the positions appropriate for a left shoe selectively during successive cycles of operations of the machine.

22. In a machine for shaping uppers over lasts, grippers for gripping the uppers of right and left shoes on their lasts at the opposite sides of the foreparts respectively and for pulling the uppers over the lasts in cycles of power operations of the machine, said grippers being mounted for movements about axes extending heightwise of the shoes to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, fluid-pressure means for thus moving said grippers and heel rest, valve mechanism movable in each cycle of operations to cause the grippers and heel rest to be moved to the positions appropriate for a right shoe in one cycle and to the positions appropriate for a left shoe in the next cycle, and means for optionally preventing such movement of the valve mechanism and for thereby preventing any such movements of the grippers and the heel rest during successive cycles of operations of the machine.

23. In a machine for shaping uppers over lasts, a toe gripper and side grippers for gripping the uppers of right and left shoes on their lasts at the ends of the toes and the opposite sides of the foreparts respectively and for pulling the uppers over the lasts, said toe gripper being mounted for movements in directions widthwise of the shoes and the side grippers for movements about axes extending heightwise of the shoes to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, and power-operated means for thus moving said toe and side grippers and heel rest to the different positions appropriate for right and left shoes.

24. In a machine for shaping uppers over lasts, a toe gripper and side grippers for gripping the uppers of right and left shoes on their lasts at the ends of the toes and the opposite sides of the foreparts respectively and for pulling the uppers over the lasts, said toe gripper being mounted for movements in directions widthwise of the shoes and the side grippers for movements about axes extending heightwise of the shoes to different positions for operating on right and left shoes respectively, fluid-pressure means for thus moving said grippers, a heel rest for determining the position of the heel end of each right or left shoe laterally by engagement with the upper at that end of the shoe, said heel rest being mounted for lateral movements to different positions for right and left shoes respectively, fluid-pressure means for thus moving said heel rest, and valve mechanism common to both said fluid-pressure means for causing simultaneous movements of the toe and side grippers and the heel rest to the positions appropriate for a right shoe or to those appropriate for a left shoe.

25. In a machine for shaping uppers over lasts, a toe gripper and side grippers for gripping the uppers of right and left shoes on their lasts at the ends of the toes and the opposite sides of the foreparts respectively and for pulling the uppers over the lasts in cycles of power operations of the machine, said toe gripper being mounted for movements in directions widthwise of the shoes and the side grippers for movements about axes extending heightwise of the shoes to different positions for operating on right and left shoes respectively, a heel rest for determining the position of the heel end of each right or left shoe laterally by engagement with the upper at that end of the shoe, said heel rest being mounted for lateral movements to different positions for right and left shoes respectively, and power-operated means for thus automatically moving said toe and side grippers and heel rest in one cycle of operations of the machine to the positions appropriate for a right shoe and in the next cycle of operations to the positions appropriate for a left shoe.

26. In a machine for shaping uppers over lasts, the combination with means for shaping over right and left lasts the foreparts of the uppers of shoes on the lasts, of a heel rest constructed and arranged to determine the position of the heel end of each right or left shoe laterally by engagement with the upper at that end of the shoe, said heel rest being mounted for movements in directions widthwise of the shoes about an axis located beyond the heel-end portion of each shoe in the direction of its toe end to different positions for right and left shoes respectively and also for movement from either of said positions lengthwise of the corresponding shoe into engagement with the heel end of the shoe, a pair of side clamps mounted to move bodily with said heel rest about said axis and also lengthwise of each shoe, and means for moving said clamps toward each other to clamp the heel-end portion of the shoe between them after the engagement of the heel rest with the shoe.

27. In a machine for shaping uppers over lasts, the combination with means for shaping over right and left lasts the foreparts of the uppers of shoes on the lasts, of a heel rest constructed and arranged to determine the position of the heel end of each right or left shoe laterally by engagement with the upper at that end of the shoe, said heel rest being mounted for movements in directions widthwise of the shoes about an axis located beyond the heel-end portion of each shoe in the direction of its toe end to different positions for right and left shoes respectively and also for movement from either of said positions lengthwise of the corresponding shoe into engagement with the heel end of the shoe, a pair of side clamps mounted to move bodily with said heel rest about said axis and also lengthwise of each shoe, and fluid-pressure means also movable with said heel rest for moving said clamps toward each other to clamp the heel-end portion of the shoe between them after the engagement of the heel rest with the shoe.

28. In a machine for shaping uppers over lasts, the combination with means for shaping over right and left lasts the foreparts of the uppers of shoes on the lasts, of a heel rest constructed and arranged to determine the position of the heel end of each right or left shoe laterally by engagement with the upper at that end of the shoe, said heel rest being mounted for movements in directions widthwise of the shoes to different positions for right and left shoes respectively and also for movement from either of said positions lengthwise of the corresponding shoe into engagement with the heel end of the shoe, a pair of side clamps mounted to move with said heel rest in directions widthwise of the shoes and also lengthwise of each shoe, fluid-pressure means also movable with said heel rest for moving said clamps toward each other to clamp the heel-end portions of the shoe between them after the engagement of the heel rest with the shoe, and means for admitting operating fluid to said fluid-pressure means thus to move said clamps in response to resistance of the shoe to further movement of the heel rest after its engagement with the shoe.

29. In a machine for shaping uppers over lasts, the combination with means for shaping over right and left lasts the foreparts of the uppers of shoes on the lasts, of a heel rest constructed and arranged to determine the position of the heel end of each right or left shoe laterally by engagement with the upper at that end of the shoe, a support for said heel rest mounted for movements in directions widthwise of the shoes to carry the heel rest to different positions for right and left shoes respectively and also for movement to carry the heel rest from either of said positions lengthwise of the corresponding shoe into engagement with the heel end of the shoe, said support being further movable relatively to the heel rest lengthwise of the shoe after engagement of the heel rest with the shoe, a pair of side clamps carried by said heel rest support to move with the heel rest in directions widthwise of the shoes and also lengthwise of each shoe, fluid-pressure means also carried by said support for moving said clamps toward each other to clamp the heel-end portion of the shoe between them after the engagement of the heel rest with the shoe, and means for admitting operating fluid to said fluid-pressure means in response to the further movement of the heel-rest support after the engagement of the heel rest with the shoe.

30. In a machine for shaping uppers over lasts, the combination with means for gripping the forepart of the upper of a shoe on a last and for pulling the upper over the last, of a heel rest for engaging the heel end of the shoe to control the shoe in the upper-pulling operation, a pair of side clamps for engaging the upper at the opposite sides of the heel-end portion of the shoe and for clamping that portion of the shoe between them, and means for relieving the pressure of said clamps on the upper and for thereafter causing them again to apply the full pressure to the upper in the course of the upper-pulling operation.

31. In a machine for shaping uppers over lasts, the combination with means for gripping the forepart of the upper of a shoe on a last and for pulling the upper over the last, of a heel rest for engaging the heel end of the shoe to control the shoe in the upper-pulling operation, a pair of side clamps for engaging the upper at the opposite sides of the heel-end portion of the shoe and for clamping that portion of the shoe between them, fluid-pressure means for operating said clamps thus to clamp the heel end of the shoe, and means for relieving the pressure of said clamps on the upper and for thereafter causing them again to apply the full pressure to the upper in the course of the upper-pulling operation by control of the fluid acting on said fluid-pressure means.

32. In a machine for shaping uppers over lasts, the combination with means for gripping the forepart of the upper of a shoe on a last and for pulling the upper over the last, of a heel rest for engaging the heel end of the shoe to control the shoe in the upper-pulling operation, a support for said heel rest mounted for movement to carry the heel rest lengthwise of the shoe into engagement with the shoe and further movable thereafter relatively to the heel rest, a pair of side clamps carried by said support for engaging the upper at the opposite sides of the heel end portion of the shoe and for clamping that portion of the shoe between them, fluid-pressure means also carried by said support for moving said clamps thus to clamp the heel end of the shoe, means for admitting operating fluid to said fluid-pressure means thus to move said clamps in response to the further movement of said support after the engagement of the heel rest with the shoe, and means also responsive to such further movement of the support for relieving the pressure of the clamps on the upper and for thereafter causing them again to apply the full pressure to the upper in the course of the upper-pulling operation by control of the fluid acting on said fluid-pressure means.

33. In a machine for shaping uppers over lasts, the combination with means for gripping the forepart of the upper of a shoe on a last and for pulling the upper over the last, of a heel rest for engaging the heel end of the shoe to control the shoe in the upper-pulling operation, a support for said heel rest mounted for movement to carry it lengthwise of the shoe into engagement with the shoe and further movable thereafter relatively to the heel rest, a pair of side clamps carried by said support for engaging the upper at the opposite sides of the heel-end portion of the shoe and for clamping that portion of the shoe between them, fluid-pressure means also carried by said support for moving said clamps thus to clamp the heel end of the shoe, means for admitting operating fluid to said fluid-pressure means thus to move said clamps in response to the further movement of said support after the engagement of the heel rest with the shoe, and a fluid-operated valve also responsive to such further movement of said support for relieving the pressure of said clamps on the upper and for thereafter causing them again to apply the full pressure to the upper in the course of the upper-pulling operation by control of the fluid acting on said fluid-pressure means.

34. In a machine for shaping uppers over lasts, a toe gripper arranged to grip tthe margin of the upper of a shoe on a last at the end of the toe, said gripper being arranged to engage the toe-end face of the last to serve as a stop for positioning the last lengthwise when it is presented to the machine, means for moving the gripper heightwise of the last to pull the upper, additional means for also moving the gripper lengthwise of the last in the direction to space the upper from the toe-end face of the last, said additional means comprising a member mounted on the gripper to move therewith and another member arranged to engage said first-named member to impart the movement lengthwise of the last to the gripper in response to its upper-pulling movement heightwise of the last, and means for preventing movement of the first-named member with the gripper until after the beginning of the upper-pulling movement of the gripper heightwise of the last and for thereby delaying its movement lengthwise of the last.

35. In a machine for shaping uppers over lasts, a toe gripper arranged to grip the margin of the upper of a shoe on a last at the end of the toe, said gripper being arranged to engage the toe-end face of the last to serve as a stop for positioning the last lengthwise when it is presented to the machine, means for moving the gripper heightwise of the last to pull the upper, additional means for also moving the gripper lengthwise of the last in the direction to space the upper from the toe-end face of the last, said additional means comprising a member mounted on the gripper to move therewith and another member arranged to engage said first-named member to impart the movement lengthwise of the last to the gripper in response to its upper-pulling movement heightwise of the last, and means for preventing movement of the first-named member with the gripper until after the beginning of the upper-pulling movement of the gripper heightwise of the last and for thereby delaying its movement lengthwise of the last, said members being constructed and arranged to cooperate with each other in holding the gripper against movement by pressure of the toe-end face of the last against it prior to such movement thereof lengthwise of the last.

36. In a machine for shaping uppers over lasts, a toe gripper arranged to grip the margin of the upper of a shoe on a last at the end of the toe, said gripper being arranged to engage the toe-end face of the last to serve as a stop for positioning the last lengthwise when it is presented to the machine, means for moving the gripper heightwise of the last to pull the upper, a member mounted on the gripper to move therewith and having a cam face thereon, another member arranged to engage said cam face and thereby to move the gripper lengthwise of the last in the direction to space the upper from the toe-end face of the last in response to the upper-pulling movement of the gripper heightwise of the last, and means for preventing movement of said first-named member with the gripper until after the beginning of the upper-pulling movement of the gripper heightwise of the last and for thereby delaying its movement lengthwise of the last.

37. In a machine for shaping uppers over lasts, a toe gripper arranged to grip the margin of the upper of a shoe on a last at the end of the toe, said gripper being arranged to engage the toe-end face of the last to serve as a stop for positioning the last lengthwise when it is presented to the machine, means for moving the gripper heightwise of the last to pull the upper, a member mounted on the gripper to move therewith and having a cam face thereon, another member arranged to engage said cam face and thereby to move the gripper lengthwise of the last in the direction to space the upper from the toe-end face of the last in response to the upper-pulling movement of the gripper heightwise of the last, a spring arranged to hold said first-named member against movement with the gripper until after the beginning of the movement of the gripper heightwise of the last, and means on the gripper for thereafter moving said member with the gripper and for thereby causing the gripper to be moved lengthwise of the last.

References Cited in the file of this patent

UNITED STATES PATENTS

| Number | Name | Date |
|---|---|---|
| 1,017,736 | Brothers | Feb. 20, 1912 |
| 1,168,963 | Perri | Jan. 18, 1916 |
| 1,169,872 | Russell | Feb. 1, 1916 |
| 1,197,516 | McFeely | Sept. 5, 1916 |
| 1,222,127 | Perri | Apr. 10, 1917 |
| 1,382,751 | Stewart | June 28, 1921 |
| 1,512,047 | Stewart | Oct. 21, 1924 |
| 2,524,883 | Choice | Oct. 10, 1950 |